C. H. STRAIGHT.
COVER FOR MILK RECEPTACLES.
APPLICATION FILED MAY 13, 1914.

1,116,950.

Patented Nov. 10, 1914.

UNITED STATES PATENT OFFICE.

CLARK H. STRAIGHT, OF BRISTOL, RHODE ISLAND, ASSIGNOR TO EVERETT L. WALLING, OF UNION VILLAGE, RHODE ISLAND.

COVER FOR MILK-RECEPTACLES.

1,116,950.   Specification of Letters Patent.   Patented Nov. 10, 1914.

Application filed May 13, 1914. Serial No. 838,307.

*To all whom it may concern:*

Be it known that I, CLARK H. STRAIGHT, a citizen of the United States, residing at Bristol, in the county of Bristol and State of Rhode Island, have invented new and useful Improvements in Covers for Milk-Receptacles, of which the following is a specification.

My present invention pertains to covers for cans and other receptacles, particularly receptacles for milk; and it consists in the simple, easily handled, sanitary and clean cover hereinafter described and definitely claimed.

Figure 1:
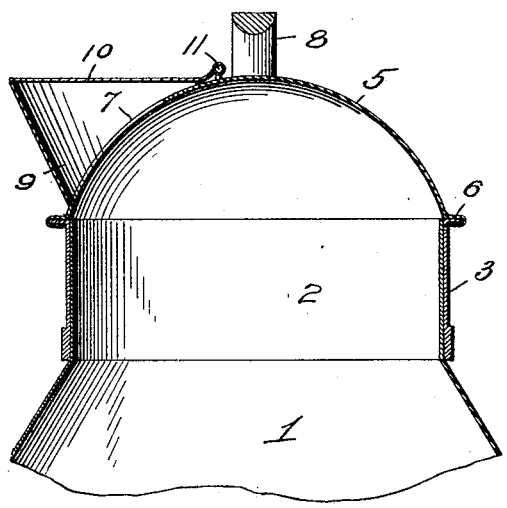
Figure 2:
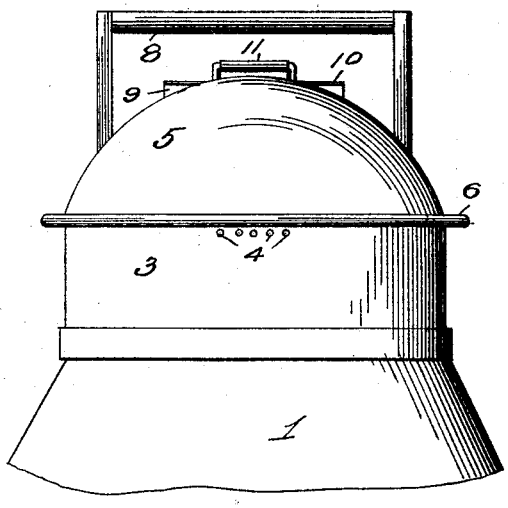
Figure 3:
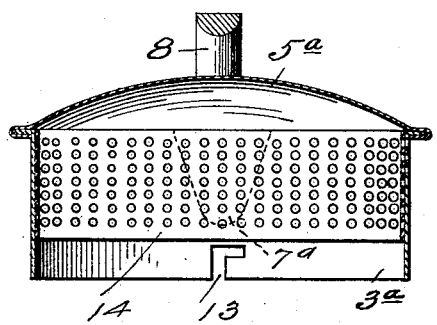
Figure 4:
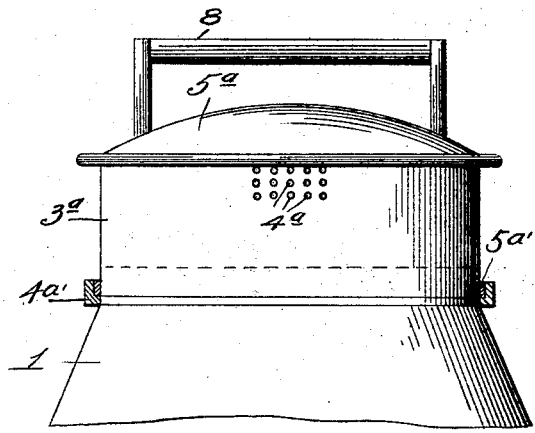

In the drawings accompanying and forming part of this specification, Figure 1 is a diametrical section illustrating the preferred embodiment of my invention as properly positioned on the neck of a milk can. Fig. 2 is an elevation of the same, illustrating the ventilating openings at the back of the cover. Fig. 3 is a diametrical section of a modified cover embodying a foraminous screen for straining the milk precedent to the passage of the same through the spout of the cover. Fig. 4 is a rear elevation showing the modified cover as positioned on the neck of a milk can.

Similar numerals designate corresponding parts in Figs. 1 and 2 of the drawings, to which reference will first be had.

The milk can body 1 is provided with a conventional neck 2, and is otherwise of the ordinary well known construction. My novel cover is removably placed so as to snugly surround the neck 2, as shown in Fig. 1. Frictional contact may be depended on to retain the cover against casual displacement from the neck 2, or the cover may be positively secured on the neck 2 through the medium of a bayonet slot or any other approved construction, without involving departure from the scope of my claimed invention.

The cover comprises an annular portion 3 that snugly surrounds the neck 2, and is provided near its upper edge, and preferably in its back, with a horizontal series of horizontally disposed vent apertures 4, a dome-like top 5 joined through a circumferential bead 6 with the annular portion 3, and having a discharge opening 7, and also having, by preference, a handle 8, a spout 9 fixed to the dome-like top and communicating with the opening 7, and a spout-cover 10, hinged at 11 to the dome-like cover.

It will be gathered from the foregoing that by reason of my novel cover being provided with the openings 4 it can be used as a ventilator for permitting the escape of heat before the milk is hermetically closed in the can; also, that the utilization of the cover is carried out in such manner as to positively preclude the entrance of dirt or other foreign substance into the can. This will be better understood when it is stated that to enable the cover to serve as a ventilator, it is simply necessary to raise the cover on the neck 2 sufficiently to position the apertures 4 in a horizontal plane above the upper edge of the neck 2. Again it will be appreciated that the horizontal disposition of the apertures 4 enable them to permit the free escape of heat while reducing to a minimum the liability of dirt gaining access to the interior of the can. The spout cover 10 normally closes the spout, and automatically closes incidental to the replacing of the can in an upright position after the pouring of milk through the opening 7 and the spout 9. From this it follows that there is little liability of dirt or other foreign substance getting into the can through the spout 9 and the opening 7.

Another advantage peculiar to my novel cover resides in the fact that because of its openings and its spout cover 10, relatively arranged as described, the novel cover cannot be used as a drinking cup. This will be considered an important advantage when it is borne in mind that a careless person can remove the ordinary milk can cover and use it as a cup, and then when such cover is replaced, there is liability of disease germs or other foreign substance reaching the milk in the can.

The modified cover shown in Fig. 3 is provided with an annular portion 3ª adapted to surround the neck of a milk can 1, the upper edge of the said neck being indicated by a dotted line, Fig. 4. Said annular portion 3ª is provided with a bayonet slot 13 for its positive connection to the neck of the milk can, and is also provided with vent apertures 4ª which when the cover is in use are always in position to maintain communication between the interior of the can and the atmosphere, except when they are closed by the foraminous annulus 14, hereinafter specifically described. In addition to the annular portion 3ª, the modified cover comprises a top 5ª having, by preference, a handle 8, and also having an opening, a spout and a spout cover, similar to the corresponding elements or features of the cover shown in Figs. 1 and 2; the opening 7ª of the modified cover being shown by dotted lines in Fig. 3.

The foraminous annulus of the embodiment shown in Figs. 3 and 4 is snugly arranged in the annular portion 3ª of the cover, and is adapted at all times to screen the milk precedent to its passage through the opening 7ª, and is also adapted to reduce to a minimum the passage of foreign substance through the opening 7ª into the can. In the position shown in Fig. 3, certain apertures of the annulus 14 register with the apertures 4ª, so as to prevent the annulus from interfering with the escape of heat from the can. When, however, it is desired to hermetically close the can, it is simply necessary to turn the annulus 14 in the cover portion 3ª so as to dispose imperforate portions of said annulus 14 opposite the vent openings 4ª.

When desirable, the embodiment shown in Figs. 1 and 2 may be provided with a foraminous annulus for one of the purposes ascribed to the annulus 14 of Fig. 3, namely—to screen the opening 7. It will be understood, however, that when an annulus having foraminations is arranged in the dome-like top 5, the said annulus would be of concavo-convex form in cross-section, in order to conform to the curvature of the dome-like top 5.

An important feature common to both embodiments of my invention resides in the fact that the closure cover surrounds the neck of the can and is arranged exterior of said neck. This is advantageous inasmuch as it lessens the liability of foreign substance gaining access to the interior of the can. This will be better appreciated when it is stated that in the employment of my improvement any milk that lodges between the cover and the neck and the dirt collected by the milk cannot flow back inside the can but must always remain on the outside.

With a view to preventing dripping of the milk or other liquid that lodges between the neck and the cover, on the outside of the can so as to render the can as a whole untidy in appearance, I may when the same is deemed necessary or desirable provide the can body with an annular seat to receive the lower edge of the cover. Such a seat is shown in Fig. 4 and numbered 4ª′, and it may when desired be provided at its inner side with a gasket 5ª′, adapted to tightly fit the cover and hold the same.

While my novel closure is designed more particularly for use on milk cans, milk bottles, and milk receptacles in general, I desire it distinctly understood that the cover is applicable to and is adapted to be used to advantage on receptacles for holding liquids and other substances other than milk.

Having described my invention, what I claim and desire to secure by Letters-Patent, is:

1. A receptacle cover comprising an annular side portion constructed and arranged to surround a can neck and having a horizontally-disposed vent near its upper edge; said cover also having a discharge opening and a spout in communication with said opening and further having a gravitating spout cover.

2. A receptacle cover comprising a side portion constructed and arranged to snugly engage a can neck and having a vent near its upper edge, and a dome-like top fixed to the side portion and provided with a discharge opening and a spout in communication therewith and also provided with a gravitating spout cover.

3. The combination with a receptacle cover having a side portion in which is a vent and also having a dome and a discharge opening, a spout in communication therewith, and a gravitating spout cover; of a foraminous annulus adjustably arranged in the cover opposite the vent and the discharge opening.

In testimony whereof I have hereunto set my hand in presence of two subscribing witnesses.

CLARK H. STRAIGHT.

Witnesses:
LOWNDES A. SMITH, Jr.,
IDA P. GREENMAN.

Copies of this patent may be obtained for five cents each, by addressing the "Commissioner of Patents, Washington, D. C."